(12) United States Patent
Wang et al.

(10) Patent No.: US 9,110,327 B2
(45) Date of Patent: Aug. 18, 2015

(54) TRANS-REFLECTIVE LIQUID CRYSTAL DISPLAY ARRAY SUBSTRATE, MANUFACTURING METHOD THEREOF AND DISPLAY DEVICE

(71) Applicant: BOE Technology Group Co., Ltd., Beijing (CN)

(72) Inventors: Can Wang, Beijing (CN); Wei Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 26 days.

(21) Appl. No.: 13/993,955

(22) PCT Filed: Nov. 29, 2012

(86) PCT No.: PCT/CN2012/085566
§ 371 (c)(1),
(2) Date: Jun. 13, 2013

(87) PCT Pub. No.: WO2013/135073
PCT Pub. Date: Sep. 19, 2013

(65) Prior Publication Data
US 2014/0111747 A1    Apr. 24, 2014

(30) Foreign Application Priority Data

Mar. 15, 2012  (CN) .......................... 2012 1 0068942
Apr. 9, 2012    (CN) .......................... 2012 1 0102142

(51) Int. Cl.
G02F 1/1337   (2006.01)
G02F 1/1335   (2006.01)
G02F 1/1333   (2006.01)
G02F 1/1362   (2006.01)

(52) U.S. Cl.
CPC .... *G02F 1/133512* (2013.01); *G02F 1/133371* (2013.01); *G02F 1/133514* (2013.01); *G02F 1/133555* (2013.01); *G02F 1/136209* (2013.01); *G02F 2201/40* (2013.01)

(58) Field of Classification Search
CPC ...................... G02F 1/133555; G02F 1/133371
USPC .......................................... 349/114, 110–111
See application file for complete search history.

(56) References Cited

U.S. PATENT DOCUMENTS

| | | | |
|---|---|---|---|
| 5,789,761 | A | 8/1998 | Ihara et al. |
| 6,683,667 | B2 | 1/2004 | Jin et al. |
| 2014/0111747 | A1 | 4/2014 | Wang et al. |

FOREIGN PATENT DOCUMENTS

| | | |
|---|---|---|
| CN | 1924654 A | 3/2007 |
| CN | 101067706 A | 11/2007 |
| CN | 102681245 A | 9/2012 |

OTHER PUBLICATIONS

International Preliminary Report on Patentability for International Application No. PCT/CN2012/085566 dated Sep. 16, 2014, 11pgs.

(Continued)

*Primary Examiner* — Phu Vu

(57) ABSTRACT

A trans-reflective liquid crystal display array substrate and a manufacturing method thereof. The trans-reflective liquid crystal display array substrate (1) includes a substrate (11) and a thin film transistor (12) provided thereon. A black matrix (13) is provided on the thin film transistor (12) and a reflective layer (14) is located on the black matrix (14). The brightness of the liquid crystal display panel is increased by enlarging the pixel aperture ratio.

15 Claims, 4 Drawing Sheets

(56) References Cited

OTHER PUBLICATIONS

First Office Action for Chinese patent application 201210102142.X (Chinese language), issued by the State Intellectual Property Office, Oct. 23, 2013, 7 pages.

English translation of the First Office Action for CN201210102142.X, listed above, 4 pages.
PCT International Search Report (Chinese language) issued by the International Searching Authority, Mar. 15, 2013, 14 pages.
English translation of CN102681245, listed above, 16 pages.
English translation of CN1924654, listed above, 12 pages.
English translation of CN101067706, listed above, 19 pages.

| R | G | B |
|---|---|---|
| R | G | B |
| R | G | B |

FIG. 4

| R | G | B |
|---|---|---|
| B | R | G |
| G | B | R |

FIG. 5

| R | G | B |
|---|---|---|
| B | R | G |
| G | B | R |

TRANS-REFLECTIVE LIQUID CRYSTAL DISPLAY ARRAY SUBSTRATE, MANUFACTURING METHOD THEREOF AND DISPLAY DEVICE

CROSS REFERENCE TO RELATED APPLICATIONS

This application is based on International Application No. PCT/CN2012/085566 filed on Nov. 29, 2012 which claims priority to Chinese Application No. 201210065942.4 filed on Mar. 15, 2012 and Chinese Application No. 201210102142.X filed on Apr. 9, 2012, the contents of which are incorporated herein by reference.

FIELD OF THE INVENTION

The embodiments of the present invention relate to a trans-reflective liquid crystal display array substrate and a manufacturing method thereof.

BACKGROUND OF THE INVENTION

Thin film transistor liquid crystal display (TFT-LCD) is a non-self-luminous flat panel display, which needs external light source to provide light required for image displaying. Based on the type of the external light source, the thin-film transistor liquid crystal display can generally be divided into reflective thin film transistor liquid crystal display with ambient light as the light source, transmissive thin film transistor liquid crystal display with a backlight assembly as the light source, and trans-reflective thin film transistor liquid crystal display having characteristics of both the above two types.

The main feature of the trans-reflective liquid crystal display is dividing the pixel in a conventional thin film transistor liquid crystal display into a transmissive sub-pixel electrode made of a transparent conductive material and a reflective sub-pixel electrode made of a metal material, and simultaneously driving the transmissive and reflective sub-pixels by using a pixel circuit provided at an intersecting region between a scanning line and a data line. In the prior art, the reflective layer is disposed in a pixel region with RGB color filters, and thus, it will cause that the part of the pixel region is reduced in area, the pixel aperture ratio is decreased, thereby affecting the brightness of the liquid crystal display panel.

SUMMARY OF THE INVENTION

One embodiment of the invention provides a trans-reflective liquid crystal display array substrate, comprising a substrate and a thin film transistor provided on the substrate, wherein, a black matrix and a reflective layer located on the black matrix are provided over the thin film transistor.

Another embodiment of the invention provides a trans-reflective liquid crystal display panel, comprising the array substrate as mentioned above, further comprising a color filter substrate opposed to and bonded with the array substrate.

A further embodiment of the invention provides display device comprising the trans-reflective liquid crystal display panel as mentioned above.

Still another embodiment of the invention provides manufacturing method of a trans-reflective liquid crystal display array substrate, comprising: forming a thin film transistor on a substrate; depositing a protective layer on the substrate formed with the thin film transistor, and performing a patterning process; forming a pixel electrode layer on the protective layer, and performing one patterning process on the pixel electrode layer in such a way that the pixel electrode layer covers a region same as the protective layer, and the pixel electrode layer is connected to a drain electrode of the thin film transistor; forming a black matrix on the thin film transistor, a gate line and a data line on the substrate; and forming a reflective layer on the black matrix.

In the trans-reflective liquid crystal display substrate and the manufacturing method thereof, the black matrix is provided on the TFT array substrate, and the reflective film, which is disposed on the pixel electrode in the prior art, is provided on the black matrix, which enlarge the transmissive area of a pixel unit and increase the aperture ratio of the pixel. Further, since the pixel electrode is provided above the protective layer and the distance between the data line of the TFT and the pixel electrode, the capacitance between the pixel electrode and the data line is reduced, the stability of the trans-reflective liquid crystal display substrate is enhanced, and further the brightness of the liquid crystal is increased.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

FIG. 4 is a structural schematic diagram illustrating arrangement of color filter films in a color filter substrate according to an embodiment of the invention;

FIG. 5 is a structural schematic diagram illustrating arrangement of color filter films in another color filter substrate according to an embodiment of the invention;

FIG. 6 is a structural schematic diagram illustrating arrangement of color filter films in another color filter substrate according to an embodiment of the invention;

DETAILED DESCRIPTION OF THE PREFERRED EMBODIMENTS

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

First Embodiment

Figure 1:
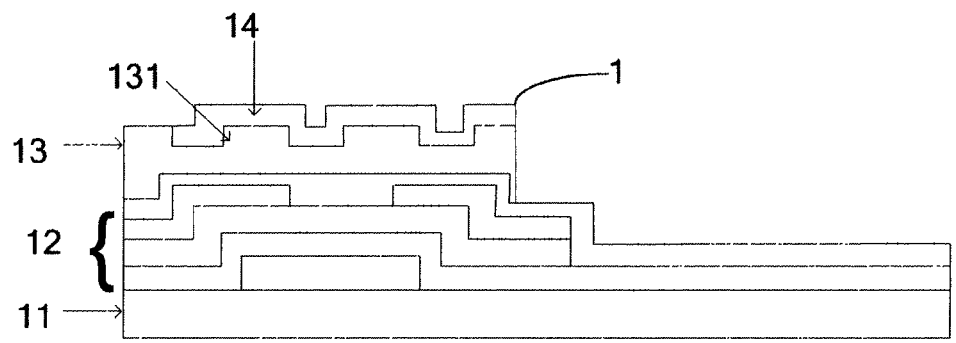
FIG. 1 is a structural schematic diagram of a trans-reflective liquid crystal display array substrate according to an embodiment of the invention.

The embodiment of the invention provides a trans-reflective LCD array substrate, as illustrated in FIG. 1. The trans-reflective LCD array substrate 1 includes: a substrate 11, a thin film transistor 12, a gate line and a data line (not shown in FIG. 1). A black matrix 13 is provided on the thin film transistor 12, the gate line and the data line (not shown in FIG. 1), and a reflection layer 14 is provided on the black matrix 13.

In the embodiment of the invention, the black matrix 13 is formed with protrusions 131 after exposure by using a grey tone and a half tone mask. For example, the protrusions 131 are formed in a region of the thin film transistor on the array substrate. The region of the thin film transistor is a region where the thin film transistor is located on the array substrate. The thin film transistor 12 mainly comprises a gate electrode, a gate insulating layer, a semiconductor active layer, a source electrode, a drain electrode, etc.

The protrusions 131 formed on the black matrix 13 diffusely reflect the external light entering into the liquid crystal display array panel, so that the light can be uniformly reflected. That is, the reflective layer 14 is conformally formed on the black matrix 13 formed with the protrusions 131 in the region corresponding to the thin film transistor. The reflective film, which is provided on the pixel electrode, is provided on the black matrix in the present embodiment, so that the light transmittance area of a pixel unit is increased, the aperture ratio of the pixel becomes large, and further the brightness of the liquid crystal display substrate is enhanced.

Further, the reflective layer 14 is coated on the protrusions 131 of the black matrix 13 in the embodiment of the present invention, and diffusely reflects the external light entering into the array substrate of the liquid crystal display, so that the light can be reflected out of the liquid crystal display panel uniformly, and the brightness of the liquid crystal display panel is improved.

The reflective layer 14 may be a metal layer with reflection effect, for example, metals such as molybdenum or aluminum-neodymium.

Figure 2:
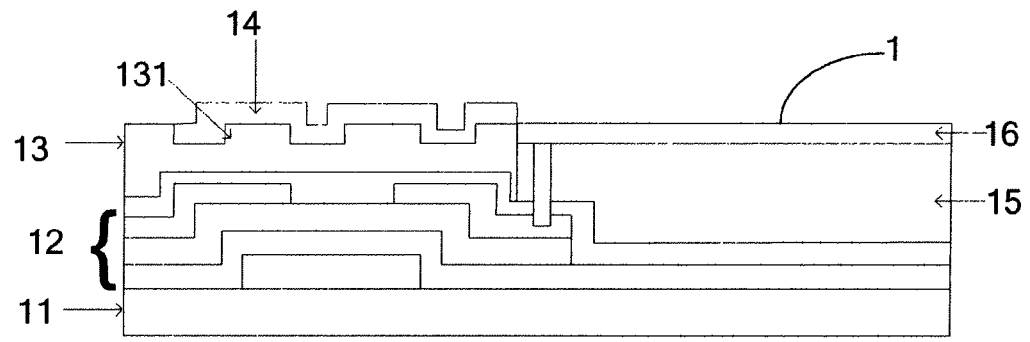
FIG. 2 is a structural schematic diagram of another trans-reflective liquid crystal display array substrate according to an embodiment of the invention.

Further, as illustrated in FIG. 2, the array substrate 1 provided by the embodiment of the invention further comprises:

A protective layer (OC) 15 and a pixel electrode 16 connected to the drain electrode of the thin film transistor on the substrate 11.

The protective layer 15 is deposited on the substrate 11 formed with the thin film transistor 12, and is connected with the black matrix 13 and covers the same region as the pixel electrode 16; the black matrix 13 is formed on the substrate 11 formed with the thin film transistor 12, the gate line and the data line (not shown in FIG. 1), and covers the entirety of the region of the thin film transistor device, and the region is a region of the array substrate where the thin film transistor is located on.

In one example, the reflective layer may be connected with the drain electrode of the thin film transistor. Therefore, the reflective layer may have a function of a reflective electrode. The electrical connection between the reflective layer and the drain electrode of the thin film transistor is not particularly limited. For example, the reflective layer 14 may be connected with the pixel electrode layer 16 which is connected to the drain electrode.

In the trans-reflective liquid crystal display substrate provided in the embodiment of the invention, the black matrix is provided on the TFT array substrate, and the reflective film, which is disposed on the pixel electrode in the prior art, is provided on the black matrix, which enlarges the transmissive area of a pixel unit, increases the aperture ratio of the pixel and further enhances the brightness of the liquid crystal display panel. Further, in the embodiment of the invention, since the pixel electrode is provided above the protective layer and the distance between the data line of the TFT and the pixel electrode is increased, the capacitance between the pixel electrode and the data line is reduced, the stability of the trans-reflective liquid crystal display substrate is enhanced, and further the displaying effect of the liquid crystal is improved.

Second Embodiment

Figure 3:
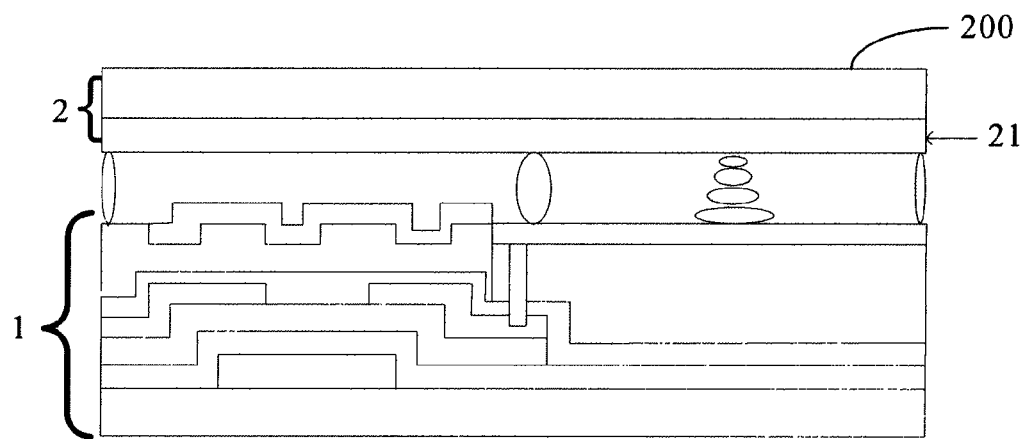
FIG. 3 is a structural schematic diagram of a trans-reflective liquid crystal display panel according to an embodiment of the invention.

As illustrated in FIG. 3, the present embodiment of the invention also provides a trans-reflective liquid crystal display panel 200, including an array substrate 1 and a color filter substrate 2 which is opposed to and bonded with the array substrate. The color filter substrate 2 is formed with continuously arranged color filter films 21 thereon.

It should be noted that, the array substrate provided in the present embodiment has the same structure as that in the first embodiment; therefore the description on the structure of the array substrate 1 is not repeated here.

Figures 4, 5, 6:
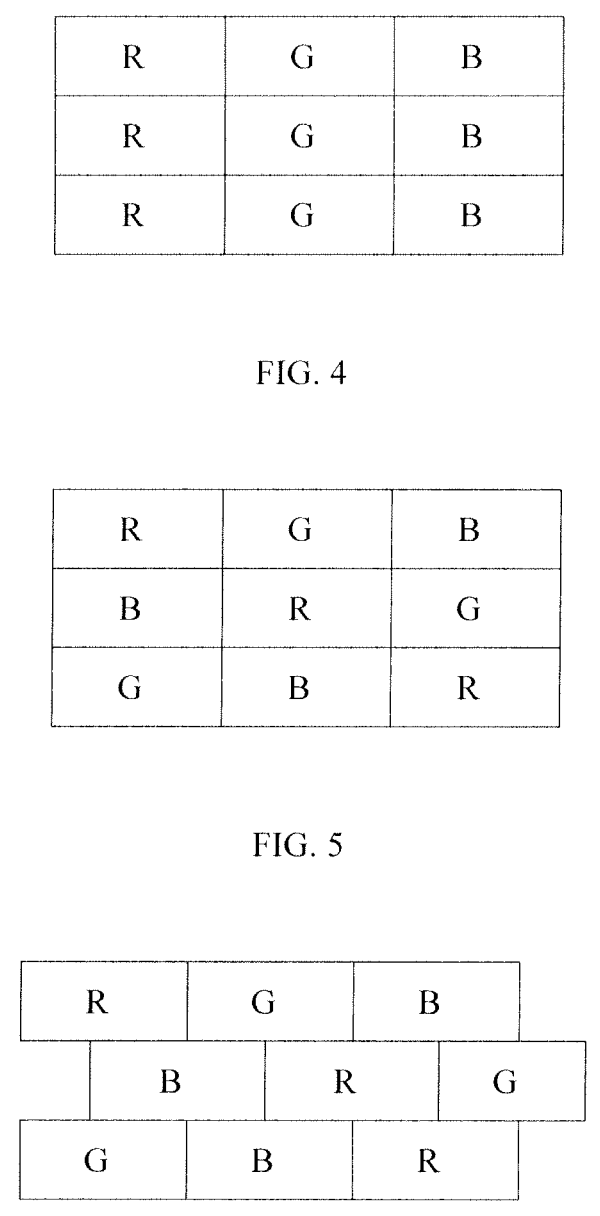

Specifically, as illustrated in FIG. 4, the color filter films 21 include a red color region R, a green color region G and a blue color region B, and the red color region R, the green color region G and the blue color region B are arranged in a strip manner, i.e., the color filter films in one column are color filter films of the same color, the color filter films in each column are connected with one another.

Alternatively, as illustrated in FIG. 5, for the color filter films 21, the red color region R, the green color region G and the blue color region B are arranged in a mosaic manner, i.e., the red color region R, the green color region G and the blue color region B are sequentially arranged with regions of the same color located at the diagonal positions.

Alternatively, as illustrated in FIG. 6, for the color filter films 21, the red color region R, the green color region G and the blue color region B in two adjacent rows are staggered with each other. As compared with FIG. 3 and FIG. 4, in the arrangement pattern, the color regions are shifted by a half of the width of the color region towards the right side or the left side for every other row.

In the trans-reflective liquid crystal display panel provided in the embodiment of the invention, the black matrix is provided on the TFT array substrate, and the reflective film, which is disposed on the pixel electrode in the prior art, is provided on the black matrix, which enlarges the transmissive area of a pixel unit, increases the aperture ratio of the pixel and further enhances the brightness of the liquid crystal display panel. Further, in the embodiment of the invention, since the pixel electrode is provided above the protective layer and the distance between the data line of the TFT and the pixel electrode is increased, the capacitance between the pixel electrode and the data line is reduced, the stability of the trans-reflective liquid crystal display substrate is enhanced, and further the displaying effect of the liquid crystal is improved.

Third Embodiment

Hereinafter, a manufacturing method of a trans-reflective liquid crystal display array substrate is described by connection with FIGS. 7 to 12.

First, a manufacturing method of the TFT array substrate in the liquid crystal display is described, the method comprises the following steps.

S701, a thin film transistor 12 is formed on a substrate 11.

Figure 7:
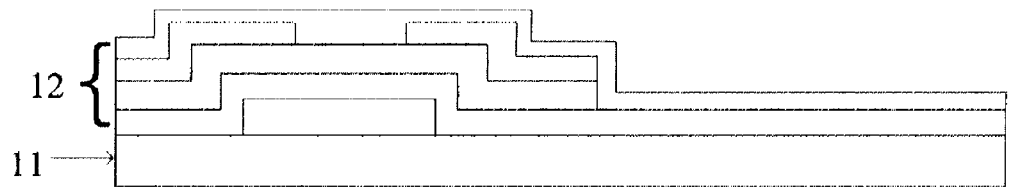
FIG. 7 is a first structural schematic diagram of an array substrate according to an embodiment of the invention.

As illustrated in FIG. 7, the thin film transistor 12 includes a gate electrode, a gate insulating layer, a semiconductor active layer, a source electrode, a drain electrode, etc.

S702, a protective layer 15 is deposited on the substrate formed with the thin film transistor 12, and a patterning process is performed.

Figure 8:
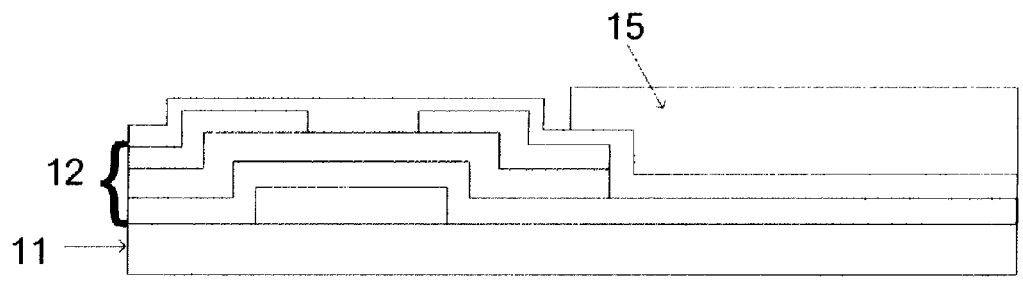
FIG. 8 is a second structural schematic diagram of the array substrate according to the embodiment of the invention.
Figure 9:
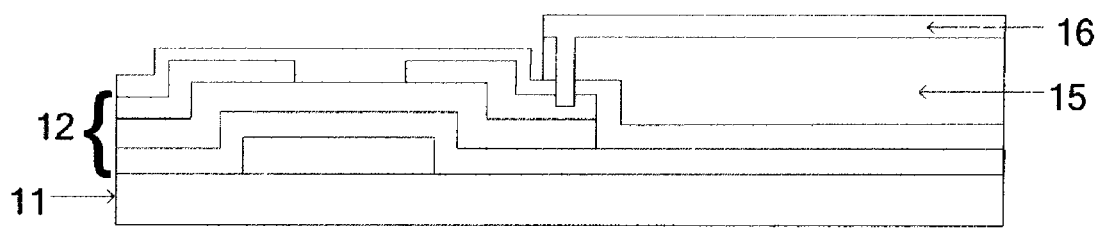
FIG. 9 is a third structural schematic diagram of the array substrate according to the embodiment of the invention.

For example, as illustrated in FIG. 8, an organic resin is applied on the substrate to form the protective layer 15, and the protective layer 15 is patterned so that the protective layer 15 is formed on a region for forming a pixel electrode on the substrate.

S703, a pixel electrode layer 16 is deposited on the protective layer 15, and the pixel electrode layer 16 is patterned so that it covers a same area as the protective layer and connected to the drain electrode.

For example, as illustrated in the figures, an indium tin oxide (ITO) layer is deposited on the protective layer 15. By one patterning process, the pixel electrode layer 16 is formed and a through-hole is formed in the pixel electrode layer 16, so that the pixel electrode layer 16 is connected to the drain electrode. In the embodiment of the invention, the pixel electrode layer 16 is provided on the protective layer 15, and the pixel electrode layer 16 and the protective layer 15 covers the same area due to they being subjected to one patterning process. After the protective layer 15 is provided, the distance between the pixel electrode layer and the data line of the thin film transistor on the array substrate is increased, thereby reducing the capacitance between the pixel electrode layer and the data line, and enhancing the stability of image displaying of the liquid crystal display, thus helping to improve the screen displaying effect of the liquid crystal display.

S704, black photoresist 13 is applied on the substrate 11.

Figure 10:
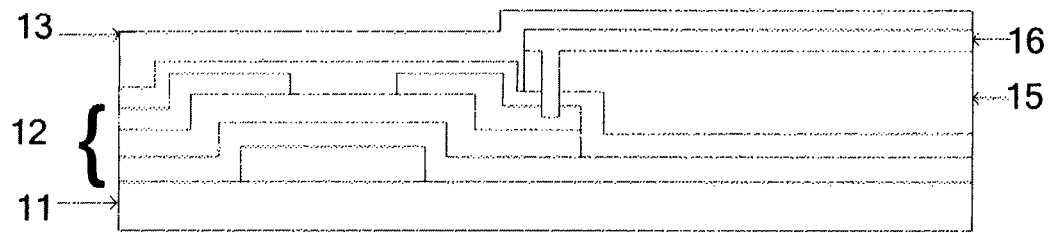
FIG. 10 is a fourth structural schematic diagram of the array substrate according to the embodiment of the invention.

For example, as illustrated in FIG. 10, a layer of black photoresist 13 is coated on the substrate, and the black photoresist 13 is a structure of black matrix which has not been subjected to processing and treatment on the array substrate.

S705, by using a gray tone mask or half tone mask 20, the black photoresist 13 is patterned.

Figure 11:
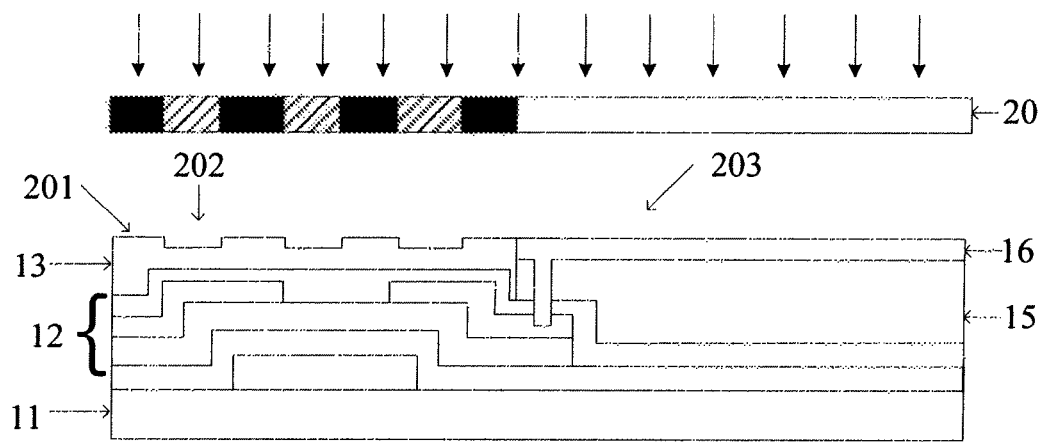
FIG. 11 is a fifth structural schematic diagram of the array substrate according to the embodiment of the invention.

As illustrated in FIG. 11, specifically, after the photoresist 13 is patterned, a black photoresist completely retained region 201, a black photoresist partially retained region 202 and a black photoresist completely removed region 203 are formed. In one pixel unit, the black photoresist completely retained region 201 and the black photoresist partially retained region 202 correspond to a region in which the black matrix is located on the thin film transistor, the black photoresist completely removed region 203 correspond to the region for the pixel electrode.

After the black photoresist is exposed and developed, the black photoresist in the completely removed region 203 is removed, and the black matrix is formed. The black photoresist in the partially retained region 202 is partially removed so that the completely retained region 201 is formed into protrusions with respect to the partially retained region 202, which will diffusely reflects the light entering into the liquid crystal display.

S706, a reflective layer 14 is deposited on the black matrix 13 formed with the protrusions 131.

Figure 12:
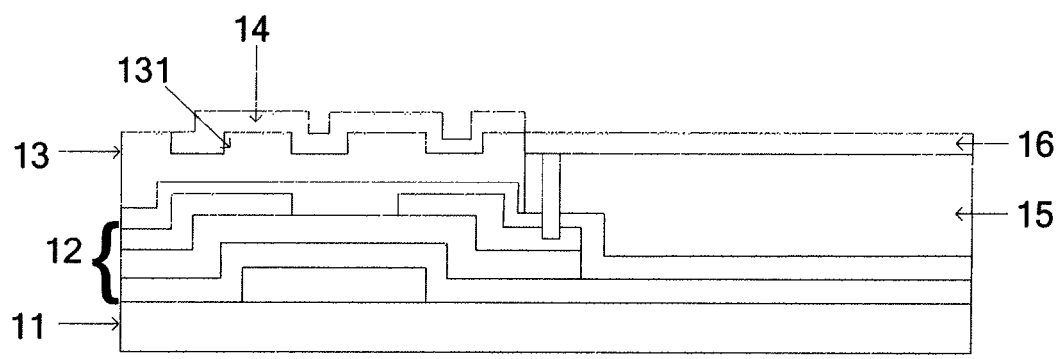
FIG. 12 is a sixth structural schematic diagram of the array substrate according to the embodiment of the invention.

Specifically, as illustrated in FIG. 12, the reflective layer 14 is deposited on the black matrix 13; after an etching process, the reflective layer 14 is retained on the black matrix 13 with the protrusions 131, so as to diffusely reflect the external light entering into the liquid crystal display substrate, uniformly reflect the light out of the liquid crystal display panel, and improve the brightness of the liquid crystal display panel. That is, the reflective layer 14 is formed conformally on the black matrix 13 formed with the protrusions 131 in the region corresponding to the thin film transistor.

The reflective layer 14 may be a metal layer with reflection effect, and the metal can be, for example, molybdenum or aluminum-neodymium.

In one example, the reflective layer may be connected to the drain electrode of the thin film transistor. Therefore, the reflective layer may function as a reflective electrode. The electrical connection between the reflective layer and the drain electrode of the thin film transistor is not particularly limited. For example, the reflective layer 14 may be connected to the pixel electrode layer 16 connected with the drain electrode.

A manufacturing method of a color filter substrate in the liquid crystal display will be described. Color filter films including a red color region, a green color region, and a blue color region are deposited on the color filter substrate. During the deposition of the color filter films, the red color region, the green color region, and the blue color region is continuously arranged.

For example, the red color region, the green color region, and the blue color region of the color filter films are deposited so as to form in a strip-like arrangement, a mosaic arrangement, or an arrangement in which the color regions continuously arranged in two adjacent rows are staggered.

It should be noted that, in the manufacturing process of the TFT array substrate of the trans-reflective liquid crystal display provided in the embodiment of the present invention, the black matrix and the pixel electrode layer are in the same plane; therefore, the method described in the step S703 and the steps S704 to S705 can be performed in different sequences.

In the manufacturing method of the trans-reflective liquid crystal display substrate provided in the embodiments of the invention, the black matrix is provided on the TFT array substrate, and the reflective film, which is disposed on the pixel electrode in the prior art, is provided on the black matrix, which enlarges the transmissive area of a pixel unit, increases the aperture ratio of the pixel, and further increases the brightness of the liquid crystal display substrate. Further, in the embodiments of the invention, since the pixel electrode is provided above the protective layer and the distance between the data line of the TFT and the pixel electrode, the capacitance between the pixel electrode and the data line is reduced, the stability of the trans-reflective liquid crystal display substrate is enhanced, and further the brightness of the liquid crystal is increased.

The above description is only exemplary implementations of the present invention, but not for limiting the scope of the invention; instead, the scope of the invention should be defined by the appended claims.

What is claimed is:

1. A trans-reflective liquid crystal display array substrate, comprising a substrate and a thin film transistor provided on the substrate, wherein,
    a black matrix and a reflective layer located on the black matrix are provided over the thin film transistor;
    the array substrate further comprises a protective layer and a pixel electrode provided above the protective layer and connected to a drain electrode of the thin film transistor; wherein, the protective layer is connected with the black matrix and covers a same region as the pixel electrode.

2. The trans-reflective liquid crystal display array substrate according to claim 1, wherein the reflective layer is electrically connected to a the drain electrode of the thin film transistor.

3. The trans-reflective liquid crystal display array substrate according to claim 1, wherein a plurality of protrusions are formed on the black matrix.

4. The trans-reflective liquid crystal display array substrate according to claim 3, wherein the protrusions are formed in a region of the array substrate where the thin film transistor is located.

5. The trans-reflective liquid crystal display array substrate according to claim 1, wherein the reflective layer is formed on the protrusions of the black matrix.

6. The trans-reflective liquid crystal display array substrate according to claim 5, wherein the reflective layer is a metal layer having a reflection effect.

7. The trans-reflective liquid crystal display array substrate according to claim 6, wherein material of the metal layer for forming the reflective layer is molybdenum or aluminum-neodymium.

8. A trans-reflective liquid crystal display panel, comprising the array substrate according to claim 1, further comprising a color filter substrate opposed to and bonded with the array substrate.

9. A manufacturing method of a trans-reflective liquid crystal display array substrate, comprising:
   forming a thin film transistor on a substrate;
   depositing a protective layer on the substrate formed with the thin film transistor, and performing a patterning process;
   forming a pixel electrode layer on the protective layer, and performing one patterning process on the pixel electrode layer in such a way that the pixel electrode layer covers a region same as the protective layer, and the pixel electrode layer is connected to a drain electrode of the thin film transistor;
   forming a black matrix on the thin film transistor, a gate line and a data line on the substrate; and
   forming a reflective layer on the black matrix.

10. The manufacturing method of the trans-reflective liquid crystal display array substrate according to claim 9, wherein the reflective layer is electrically connected to the drain electrode of the thin film transistor.

11. The manufacturing method of the trans-reflective liquid crystal display array substrate according to claim 9, wherein forming the black matrix on the substrate formed with the thin film transistor comprising:
   applying black photoresist on the substrate;
   patterning the black photoresist by using a gray tone mask or a half tone mask so as to form a black photoresist completely retained region, a black photoresist partially retained region and a black photoresist completely removed region; wherein, in the pixel unit, the black photoresist completely retained region and the black photoresist partially retained region correspond to a region of the thin film transistor, the black photoresist completely removed region corresponds to a region of the pixel electrode.

12. The manufacturing method of the trans-reflective liquid crystal display array substrate according to claim 11, wherein the protrusions are formed in a region of the array substrate where the thin film transistor is located.

13. The manufacturing method of the trans-reflective liquid crystal display array substrate according to claim 9, wherein the reflective layer is formed on the protrusions of the black matrix.

14. The manufacturing method of the trans-reflective liquid crystal display array substrate according to claim 13, wherein the reflective layer is a metal layer having a reflection effect.

15. The manufacturing method of the trans-reflective liquid crystal display array substrate according to claim 14, wherein material of the metal layer for forming the reflective layer is molybdenum or aluminum-neodymium.

* * * * *